United States Patent [19]

Fukuda

[11] Patent Number: 4,557,340
[45] Date of Patent: Dec. 10, 1985

[54] METHOD OF COMBINATORIAL WEIGHING IN A COMBINATORIAL WEIGHING MACHINE

[75] Inventor: Masao Fukuda, Shiga, Japan

[73] Assignee: Kabushiki Kaisha Ishida Koki Seisakusho, Kyoto, Japan

[21] Appl. No.: 660,104

[22] Filed: Oct. 12, 1984

[30] Foreign Application Priority Data

Oct. 14, 1983 [JP] Japan .................................. 58-191992

[51] Int. Cl.$^4$ ...................... G01G 19/00; G01G 19/22
[52] U.S. Cl. ......................................... 177/1; 177/25; 364/567
[58] Field of Search ............... 177/1, 25, 50, DIG. 12; 364/567

[56] References Cited

U.S. PATENT DOCUMENTS 4,418,771 12/1983 Henry et al. ............................. 177/1
4,466,500 8/1984 Masher et al. .......................... 177/1

FOREIGN PATENT DOCUMENTS 92914 6/1983 Japan .................................... 177/25

Primary Examiner—E. A. Goldberg
Assistant Examiner—Patrick W. Foster
Attorney, Agent, or Firm—Staas & Halsey

[57] ABSTRACT

A combinatorial weighing method in a combinatorial weighing apparatus comprises the steps of providing two groups of patterns of combinations of weight values issued from a plurality of weighing machines, one of the groups is divided into two subgroups which are complements of each other, and the two groups are successively processed independently and in combination to find an optimum weight combination closest to a target weight value.

6 Claims, 10 Drawing Figures

Fig. 4

(GROUP A)

| NO. OF WEIGHING MACHINE | | |
|---|---|---|
| 10 | 9 | |
| 0 | 0 | -- $W_0^2$ |
| 0 | 1 | |
| 1 | 0 | |
| 1 | 1 | -- $W_3^2$ |

(GROUP B)

| NO. OF WEIGHING MACHINE | | | | | | | | NO. OF COMBINATIONS |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | -- $W_1^8$ |
| 0 | 0 | 0 | 0 | 0 | 0 | 1 | 0 | |
| 0 | 0 | 0 | 0 | 0 | 0 | 1 | 1 | |
| \{ | | | | | | | | ⇒ $W_1^8 \sim W_{255}^8$ (255 COMBINATIONS) |
| 1 | 1 | 1 | 1 | 1 | 1 | 1 | 0 | |
| 1 | 1 | 1 | 1 | 1 | 1 | 1 | 1 | -- $W_{255}^8$ |

Fig. 5

| | NO. OF WEIGHING MACHINE | | | | | | | | | | NO. OF COMBINATIONS |
|---|---|---|---|---|---|---|---|---|---|---|---|
| | 10 | 9 | 8 | 7 | 6 | 5 | 4 | 3 | 2 | 1 | |
| GROUP A | 0 | 0 | 0 | 0 | 0 | 0 | 0 | 0 | 0 | 1 | -- $W_1^{10}$ |
| | 0 | 0 | 0 | 0 | 0 | 0 | 0 | 0 | 1 | 0 | |
| | 0 | 0 | 0 | 0 | 0 | 0 | 0 | 0 | 1 | 1 | |
| | \{ | | | | | | | | | | ⇒ $W_1^{10} \sim W_{511}^{10}$ (511 COMBINATIONS) |
| | 0 | 1 | 1 | 1 | 1 | 1 | 1 | 1 | 1 | 1 | -- $W_{511}^{10}$ |
| GROUP B | 1 | 0 | 0 | 0 | 0 | 0 | 0 | 0 | 0 | 0 | -- $W_{512}^{10}$ |
| | 1 | 0 | 0 | 0 | 0 | 0 | 0 | 0 | 0 | 1 | |
| | 1 | 0 | 0 | 0 | 0 | 0 | 0 | 0 | 1 | 0 | |
| | \{ | | | | | | | | | | ⇒ $W_{512}^{10} \sim W_{1022}^{10}$ (511 COMBINATIONS) |
| | 1 | 1 | 1 | 1 | 1 | 1 | 1 | 1 | 0 | 1 | |
| | 1 | 1 | 1 | 1 | 1 | 1 | 1 | 1 | 1 | 0 | -- $W_{1022}^{10}$ |
| GROUP C | 1 | 1 | 1 | 1 | 1 | 1 | 1 | 1 | 1 | 1 | $W_{1021}^{10} \equiv W^{10}$ |

Fig. 6

| | NO. OF WEIGHING MACHINE | | | | | | | | | | NO. OF COMBINATIONS | |
|---|---|---|---|---|---|---|---|---|---|---|---|---|
| | 10 | 9 | 8 | 7 | 6 | 5 | 4 | 3 | 2 | 1 | | |
| GROUP A | 0 | 0 | 0 | 0 | 0 | 0 | 0 | 0 | 0 | 1 | $C_1^{10}$ (10 COMBINATIONS) | |
| | 0 | 0 | 0 | 0 | 0 | 0 | 0 | 0 | 1 | 1 | $C_2^{10}$ (45 COMBINATIONS) | |
| | 0 | 0 | 0 | 0 | 0 | 0 | 0 | 1 | 1 | 1 | $C_3^{10}$ (120 COMBINATIONS) | 511 COMBINATIONS |
| | 0 | 0 | 0 | 0 | 0 | 0 | 1 | 1 | 1 | 1 | $C_4^{10}$ (210 COMBINATIONS) | |
| | 0 | 0 | 0 | 0 | 0 | 1 | 1 | 1 | 1 | 0 | $C_{5-1}^{10}$ (126 COMBINATIONS) | |
| | 0 | 0 | 0 | 0 | 0 | 1 | 1 | 1 | 0 | 0 | $C_{5-2}^{10}$ (126 COMBINATIONS) | |
| GROUP B | 0 | 0 | 0 | 0 | 1 | 1 | 1 | 1 | 1 | 1 | $C_6^{10}$ (210 COMBINATIONS) | |
| | 0 | 0 | 0 | 1 | 1 | 1 | 1 | 1 | 1 | 1 | $C_7^{10}$ (120 COMBINATIONS) | 511 COMBINATIONS |
| | 0 | 0 | 1 | 1 | 1 | 1 | 1 | 1 | 1 | 1 | $C_8^{10}$ (45 COMBINATIONS) | |
| | 0 | 1 | 1 | 1 | 1 | 1 | 1 | 1 | 1 | 1 | $C_9^{10}$ (10 COMBINATIONS) | |
| GROUP C | 1 | 1 | 1 | 1 | 1 | 1 | 1 | 1 | 1 | 1 | $C_{10}^{10}$ (1 COMBINATION) | 1 COMBINATION |

Fig. 7

| NO. OF WEIGHING MACHINE | | | NO. OF COMBINATIONS |
|---|---|---|---|
| 10 | 9 | GROUP A | |
| 0 | 0 | | $W_0^2$ |
| 0 | 1 | | $W_1^2$ |
| 1 | 0 | | $W_2^2$ |
| 1 | 1 | | $W_3^2$ |

| NO. OF WEIGHING MACHINE | | | | | | | | | NO. OF COMBINATIONS |
|---|---|---|---|---|---|---|---|---|---|
| 8 | 7 | 6 | 5 | 4 | 3 | 2 | 1 | GROUP B1 | |
| 0 | 0 | 0 | 0 | 0 | 0 | 0 | 1 | | $---W_1^8$ |
| 0 | 0 | 0 | 0 | 0 | 0 | 1 | 0 | | ⇧ $W_1^8 \sim W_{127}^8$ |
| 0 | 0 | 0 | 0 | 0 | 0 | 1 | 1 | | (127 COMBINATIONS) |
| 0 | 1 | 1 | 1 | 1 | 1 | 1 | 1 | | $---W_{127}^8$ |
| 1 | 0 | 0 | 0 | 0 | 0 | 0 | 0 | GROUP B2 | $---W_{128}^8$ |
| 1 | 0 | 0 | 0 | 0 | 0 | 0 | 1 | | ⇧ $W_{128}^8 \sim W_{254}^8$ |
| 1 | 0 | 0 | 0 | 0 | 0 | 1 | 0 | | (127 COMBINATIONS) |
| 1 | 1 | 1 | 1 | 1 | 1 | 1 | 0 | | $---W_{254}^8$ |
| 1 | 1 | 1 | 1 | 1 | 1 | 1 | 1 | GROUP C | $---W_{255}^8 \equiv W^8$ |

Fig. 8

| NO. OF WEIGHING MACHINE | | | | | NO. OF COMBINATIONS | |
|---|---|---|---|---|---|---|
| 10 | 9 | | | | | |
| 0 | 0 | | | | $W_0^2$ | |
| 0 | 1 | | | | $W_1^2$ | |
| 1 | 0 | | | | $W_2^2$ | |
| 1 | 1 | | | | $W_3^2$ | |
| GROUP A | | | | | | |

| | NO. OF WEIGHING MACHINE | | | | | | | | NO. OF COMBINATIONS | |
|---|---|---|---|---|---|---|---|---|---|---|
| | 8 | 7 | 6 | 5 | 4 | 3 | 2 | 1 | | |
| GROUP B1 | 0 | 0 | 0 | 0 | 0 | 0 | 0 | 1 | $C_1^8$ (8 COMBINATIONS) | $W_1^8 \sim W_{127}^8$ 127 COMBINATIONS |
| | 0 | 0 | 0 | 0 | 0 | 0 | 1 | 0 | | |
| | 1 | 0 | 0 | 0 | 0 | 0 | 0 | 0 | | |
| | 0 | 0 | 0 | 0 | 0 | 0 | 1 | 1 | $C_2^8$ (28 COMBINATIONS) | |
| | 1 | 1 | 0 | 0 | 0 | 0 | 0 | 0 | | |
| | 0 | 0 | 0 | 0 | 0 | 1 | 1 | 1 | $C_3^8$ (56 COMBINATIONS) | |
| | 1 | 1 | 1 | 0 | 0 | 0 | 0 | 0 | | |
| | 0 | 0 | 0 | 0 | 1 | 1 | 1 | 1 | $C_{4-1}^8$ (35 COMBINATIONS) | |
| | 0 | 1 | 1 | 1 | 0 | 0 | 0 | 1 | | |
| | 1 | 0 | 0 | 0 | 1 | 1 | 1 | 0 | $C_{4-2}^8$ (35 COMBINATIONS) | |
| | 1 | 1 | 1 | 1 | 0 | 0 | 0 | 0 | | |
| GROUP B2 | 0 | 0 | 0 | 1 | 1 | 1 | 1 | 1 | $C_5^8$ (56 COMBINATIONS) | $W_{128}^8 \sim W_{254}^8$ 127 COMBINATIONS |
| | 1 | 1 | 1 | 1 | 1 | 0 | 0 | 0 | | |
| | 0 | 0 | 1 | 1 | 1 | 1 | 1 | 1 | $C_6^8$ (28 COMBINATIONS) | |
| | 1 | 1 | 1 | 1 | 1 | 1 | 0 | 0 | | |
| | 0 | 1 | 1 | 1 | 1 | 1 | 1 | 1 | $C_7^8$ (8 COMBINATIONS) | |
| | 1 | 1 | 1 | 1 | 1 | 1 | 1 | 0 | | |
| GROUP C | 1 | 1 | 1 | 1 | 1 | 1 | 1 | 1 | $C_8^8$ | 1 COMBINATION |

Fig. 9

| NO. OF WEIGHING MACHINE | | | | | | | | NO. OF COMBINATIONS |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | |
| 0 | 0 | 0 | 0 | 0 | 0 | 1 | 0 | |
| 0 | 0 | 0 | 0 | 0 | 1 | 0 | 0 | |
| 0 | 0 | 0 | 0 | 1 | 0 | 0 | 0 | $C_1^8$ |
| 0 | 0 | 0 | 1 | 0 | 0 | 0 | 0 | |
| 0 | 0 | 1 | 0 | 0 | 0 | 0 | 0 | |
| 0 | 1 | 0 | 0 | 0 | 0 | 0 | 0 | |
| 1 | 0 | 0 | 0 | 0 | 0 | 0 | 0 | |
| 0 | 0 | 0 | 0 | 0 | 0 | 1 | 1 | |
| 0 | 0 | 0 | 0 | 0 | 1 | 0 | 1 | |
| 0 | 0 | 0 | 0 | 0 | 1 | 1 | 0 | |
| 0 | 0 | 0 | 0 | 1 | 0 | 0 | 1 | |
| 0 | 0 | 0 | 0 | 1 | 0 | 1 | 0 | $C_2^8$ |
| ⋮ | | | | | | | | |
| 1 | 0 | 0 | 1 | 0 | 0 | 0 | 0 | |
| 1 | 0 | 1 | 0 | 0 | 0 | 0 | 0 | |
| 1 | 1 | 0 | 0 | 0 | 0 | 0 | 0 | |
| 0 | 0 | 0 | 0 | 0 | 1 | 1 | 1 | |
| 0 | 0 | 0 | 0 | 1 | 0 | 1 | 1 | |
| 0 | 0 | 0 | 0 | 1 | 1 | 1 | 0 | $C_3^8$ |
| 0 | 0 | 0 | 1 | 0 | 0 | 1 | 1 | |
| 0 | 0 | 0 | 1 | 0 | 1 | 0 | 1 | |
| ⋮ | | | | | | | | |
| 1 | 1 | 0 | 0 | 1 | 0 | 0 | 0 | |
| 1 | 1 | 0 | 1 | 0 | 0 | 0 | 0 | |
| 1 | 1 | 1 | 0 | 0 | 0 | 0 | 0 | |
| 0 | 0 | 0 | 0 | 1 | 1 | 1 | 1 | |
| 0 | 0 | 0 | 1 | 0 | 1 | 1 | 1 | |
| 0 | 0 | 0 | 1 | 1 | 0 | 1 | 1 | $C_{4-1}^8$ |
| 0 | 0 | 0 | 1 | 1 | 1 | 0 | 1 | |
| 0 | 0 | 0 | 1 | 1 | 1 | 1 | 0 | |
| ⋮ | | | | | | | | |
| 0 | 1 | 1 | 1 | 0 | 0 | 1 | 0 | |
| 0 | 1 | 1 | 1 | 0 | 1 | 0 | 0 | |
| 0 | 1 | 1 | 1 | 1 | 0 | 0 | 0 | |

METHOD OF COMBINATORIAL WEIGHING IN A COMBINATORIAL WEIGHING MACHINE

BACKGROUND OF THE INVENTION

The present invention relates to a method of combinatorial weighing in a combinatorial weighing machine, and more particularly to a combinatorial weighing method capable of shortening a processing time for determining an optimum combination by improving patterns of weight combinations.

There is known a combinatorial weighing apparatus having a plurality of weighing machines for measuring the weights of articles therein. The combinatorial weighing apparatus operates by combining the weights from the weighing machines, finding a combination of weights which is equal to a target combination or closest to the target combination within an allowable preset range, discharging articles from the weighing machines which give such a combination found, then charging new articles into the emptied weighing machines, combining the weights from the weighing machines, and repeating the above process for successive automatic weighing operations.

FIG. 1 of the accompanying drawings schematically shows a combinatorial weighing apparatus for effecting such a combinatorial weighing operation. The apparatus includes a distribution table 11 for distributing articles radially outwardly to charge them into a plurality of n weighing sections 1, 1, ..., 1 arranged radially and circumferentially spaced around the table 11. The distribution table 11 has a vibratory feeding capability and vibrates for a given interval of time for supplying the articles into the weighing sections. Each of the n weighing sections 1 has a weighing machine 101 comprising a distributive supply unit 1a, a pool hopper 1b, a pool hopper gate 1c, a hopper driver 1g, a weighing hopper 1d, and a weight detector 1e. The distributive supply units 1a are radially mounted on a support table 1h in circumferentially surrounding relation to the distribution table 11, and each distributive supply unit 1a has an electromagnetic vibrator 1a-1 and a trough 1a-2. Articles supplied from the distribution table 1a-1 to the trough 1a-2 are charged from a distal end of the trough 1a-2 into the pool hopper 1b by linear reciprocable movement of the electromagnetic vibrator 1a-1. The articles charged in each pool hopper 1b are then charged into the weighing hopper 1d when the hopper gate 1c is opened under the control of the hopper driver 1g. The articles charged in each weighing hopper 1d are measured for their weight by the associated weight detector 1e. The weight of the articles as measured by the weight detector 1e is applied as an input to a combinatorial processor unit, described below. The combinatorial processor unit effects combinatorial weighing processing on the weights to find an optimum combination of weights. The weighing hoppers 1d of the weighing machines selected as giving the optimum combination are emptied to discharge the articles by opening the weighing hopper gates 1f by means of the hopper drivers 1g. The articles discharged from the weighing hoppers 1d fall into a collection chute 1j disposed below the weighing hoppers 1d, and are collected and delivered to a packaging machine (not shown). The collection chute 1j has a conical shape or a polygonal funnel shape. The articles are collected in the collection chute 1j by gravity or forcibly by a scraper (not shown) so that the articles will be gathered from an inner peripheral surface of the collection chute 1j toward a lower central position therein.

FIG. 2 is a block diagram of the combinatorial weighing apparatus. The combinatorial weighing apparatus includes n weighing machines 101-1, ..., 101-n each composed of the weighing hopper 1d and the weight detector 1e, described above, for weighing the weights of supplied articles and issuing weight values Wi ($i = 1, 2, ..., n$). A multiplexer 102 issues the weight values Wi from the weighing machines 101-1, ..., 101-n successively as a weight readout signal WRS, the multiplexer 102 being composed of analog switches and the like. The analog weight values Wi issued from the multiplexer 102 are converted into digital values by an A/D converter 103. A combinatorial weighing processor unit 104, in the form of a computer, basically includes a processor (central processing unit) 104a, a data memory 104b comprising a RAM, and a program memory 104c for storing a program for combinatorial processing. The processor 104a has a general-purpose register 104d. To the combinatorial weighing processor unit 104 are connected a weight setting unit 105 for setting a target weight value, upper and lower limit setting units 106, 107 for setting a preferable allowable preset range of combinatorial total weights, a display unit 108 for displaying a combinatorial total weight, selected weighing machines, weighing failures, and other information, and a discharge control unit 109.

Weighing operation of the combinatorial weighing apparatus shown in FIG. 2 will be described with reference to the flowchart of FIG. 3 and FIG. 4.

(1) When a start signal (timing signal) STS is generated by the packaging machine (not shown), the start signal STS is read by the processor 104a which then starts a combinatorial weighing process.

(2) Then, the processor 104a issues a weight readout signal WRS to the multiplexer 102 to enable the multiplexer 102 to apply the weight values Wi ($i = 1, 2, ..., n$) successively to the A/D converter 103. The weight values Wi applied to the A/D converter, are then converted thereby into digital signals which are fed to the combinatorial control unit 104, wherein the digital signals are stored by the processor 104a into the data memory 104b.

(3) Thereafter, the processor 104a effects $2^n-1$ combinatorial computations under the control of the combinatorial processing program. Where there are ten weighing machines, it has been conventional practice to combine detected weight data items from the ten weighing machines in group B composed of 1st through 8th weighing machines and in group A composed of 9th and 10th weighing machines as shown in FIG. 4. Since $n = 8$ in group B, there are $2^8-1 = 255$ combinations. With such combination patterns, the general-purpose register 104d in the processor 104a has a 1st bit allotted to the 1st weighing machine 101-1, a 2nd bit to the 2nd weighing machine 101-2, ..., an nth bit to the nth weighing machine 101-n, and the general-purpose register 104d counts from 1 up to $2^n-1$ to find $2^n-1$ combinations from 0000...001 to 1111...111.

In FIG. 4, the symbol $W_i^a$ indicates ith data given by a combination of a elements. According to this definition, $W_1^8$, for example, is indicative of a 1st added weight (combinatorial total weight) out of all combinations of eight weight data items ($W_1, W_2, ..., W_8$), and is equal to $W_1$. As another example, $W_{255}^8 = W_1 + W_2 + ... W_8$.

(4) FIG. 3 is a flowchart of a subroutine for determining one added weight (combinatorial total weight). This subroutine is executed each time one combinatorial pattern is generated. At the time of starting the subroutine, the added weight value is set to SUM=0 in a step b. Then, the processor 104a sets the numeral k stored in the data memory 104b to "1" in a step c.

(5) The processor 104a then checks bits of selected and non-selected weighing machines in a combinatorial pattern, that is, checks whether the kth bit in a combinatorial pattern is "1" or "0" in a step d.

(6) The processor 104a adds a weight value corresponding to a "1" bit in a combinatorial pattern to an added weight SUM in a step e.

(7) The processor 104a successively updates the numerical value k and repeats bit checking and weight addition until k>8 in steps d, e, f, g.

(8) The above process will be described on the basis of specific numerals with reference to FIG. 4. The processor 104a first computes all combinatorial total weight data items ($W_1^8$, $W_2^8$, ..., $W_{255}^8$) expressed in group B, and stores the data items in the data memory 104b. Then, the processor 104a adds the data items in group B and the data items in group A to find an optimum value closest to a target weight value. Since $W_0^2=0$ in group A, three combinations ($W_1^2$, $W_2^2$, $W_3^2$) may be added to the combinations of group B. Such computations are effected by the combinatorial processor unit 104 as follows:

(1) Bit checking in combinatorial pattern:

Bit checking between selected and non-selected weighing machines is effected 8 times each time the subroutine of FIG. 3 is executed once. The subroutine of FIG. 3 is executed as many times as there are combinations of the eight weighing machines. Therefore, the total number of bit checking occurrences is 8×255=2040 ... (i)

(2) Number of weight additions:

For selecting one out of eight weighing machines, there are 8 combinations, since $_8C_1=8$. The number of weight additions required in this case is 8×1=8.

For selecting two out of eight weighing machines, there are 28 combinations since $_8C_2=28$. The number of weight additions required is 28×2=56 since two additions need to be made for each combination. It follows therefore that the number of weight additions required for all combinations (255) in selecting one to eight weighing machines is given by:

$$(_8C_1 \times 1) + (_8C_2 \times 2) + (_8C_3 \times 3) + (_8C_4 \times 4) + \quad \text{(ii)}$$
$$(_8C_5 \times 1) + (_8C_6 \times 6) + (_8C_7 \times 7) + (_8C_8 \times 8) =$$
$$(8 \times 1) + \times (28 \times 2) + (56 \times 3) + (70 \times 4) +$$
$$(56 \times 5) + (28 \times 6) + (8 \times 7) + (1 \times 8) = 1024$$

Furthermore, one addition is required to compute $W_3^2$ in group A (for adding the weights from the 10th and 9th weighing machines), and 3×255=765 additions are required to be made between groups A and B. Therefore, the total number of weight additions is:

$$1024 + 1 + 765 = 1790 \quad \text{... (iii)}$$

The combinatorial processor unit 104 selects a combination closest to the target weight value, out of the combinatorial total weights thus produced, and controls the discharge control unit 109 to discharge the articles from the weighing machines which give such an optimum combination of weights. Therafter, the combinatorial processor unit 104 controls the pool hoppers to supply articles to the emptied weighing machines, and then waits for a next start signal from the packaging machine.

The process of determining an optimum weight combination using conventional combination patterns has suffered from a low processing speed since a great number of computations are necessary for bit checking and weight additions.

SUMMARY OF THE INVENTION

It is an object of the present invention to provide a method of combinatorial weighing in a combinatorial weighing apparatus, wherein the time required for computations to find an optimum weight combination can be shortened by improving weight combination patterns to reduce the number of computations for bit checking and weight additions in a combinatorial processor unit.

According to the present invention, there is provided a method of combinatorial weighing in a combinatorial weighing apparatus including a plurality of weighing machines for determining the weights of charged articles, and a combinatorial processor unit for computing combinations of weight values issued from the weighing machines and for determining an optimum weight combination equal to a target weight value or closest to the target weight value within an allowable preset range. The method comprises the steps of providing two groups of patterns of combinations of the weight values, dividing one of the groups into two subgroups which are complements of each other, and successively processing the two groups independently and in combination to find the optimum weight combination.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a diagram of conventional patterns of combinations of weight data items;

FIGS. 5 and 6 are diagrams of patterns of combinations of weight data items, used to explain the method of the present invention;

FIG. 7 is a diagram of patterns of combinations of weight data items according to an embodiment of the present invention;

FIG. 8 is a diagram of patterns of combinations of weight data items according to another embodiment of the present invention;

FIG. 9 is a diagram of combination patterns generated by the method of the present invention as they are stored in a memory.

DESCRIPTION OF THE PREFERRED EMBODIMENTS

Figure 1:
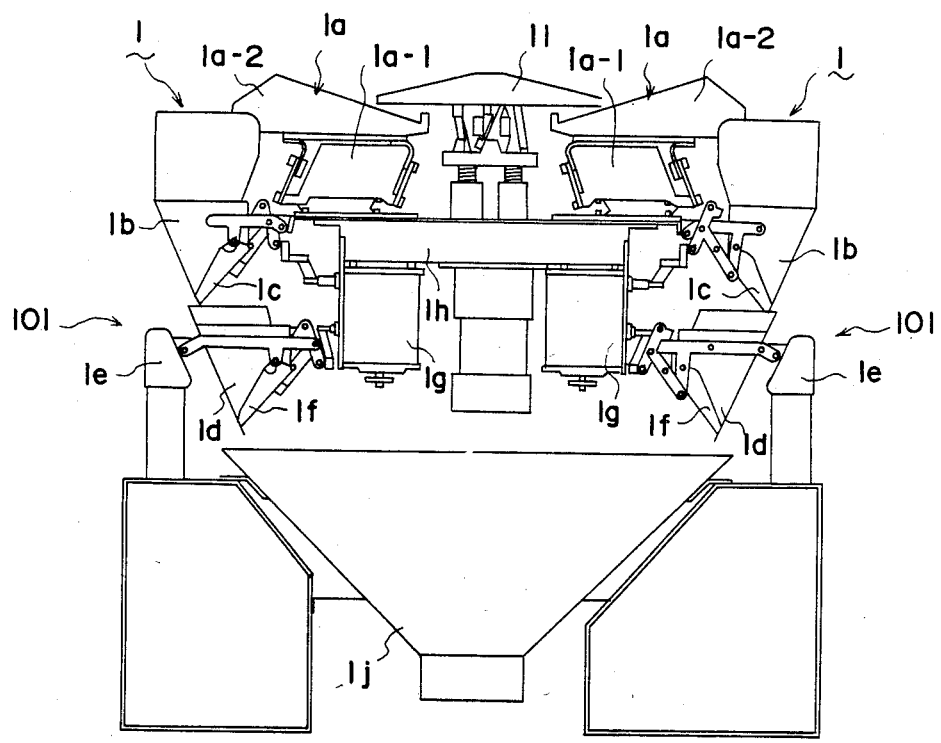
FIG. 1 is a schematic side elevational view of a combinatorial weighing apparatus in which the method of the present invention can be effected.
Figure 2:
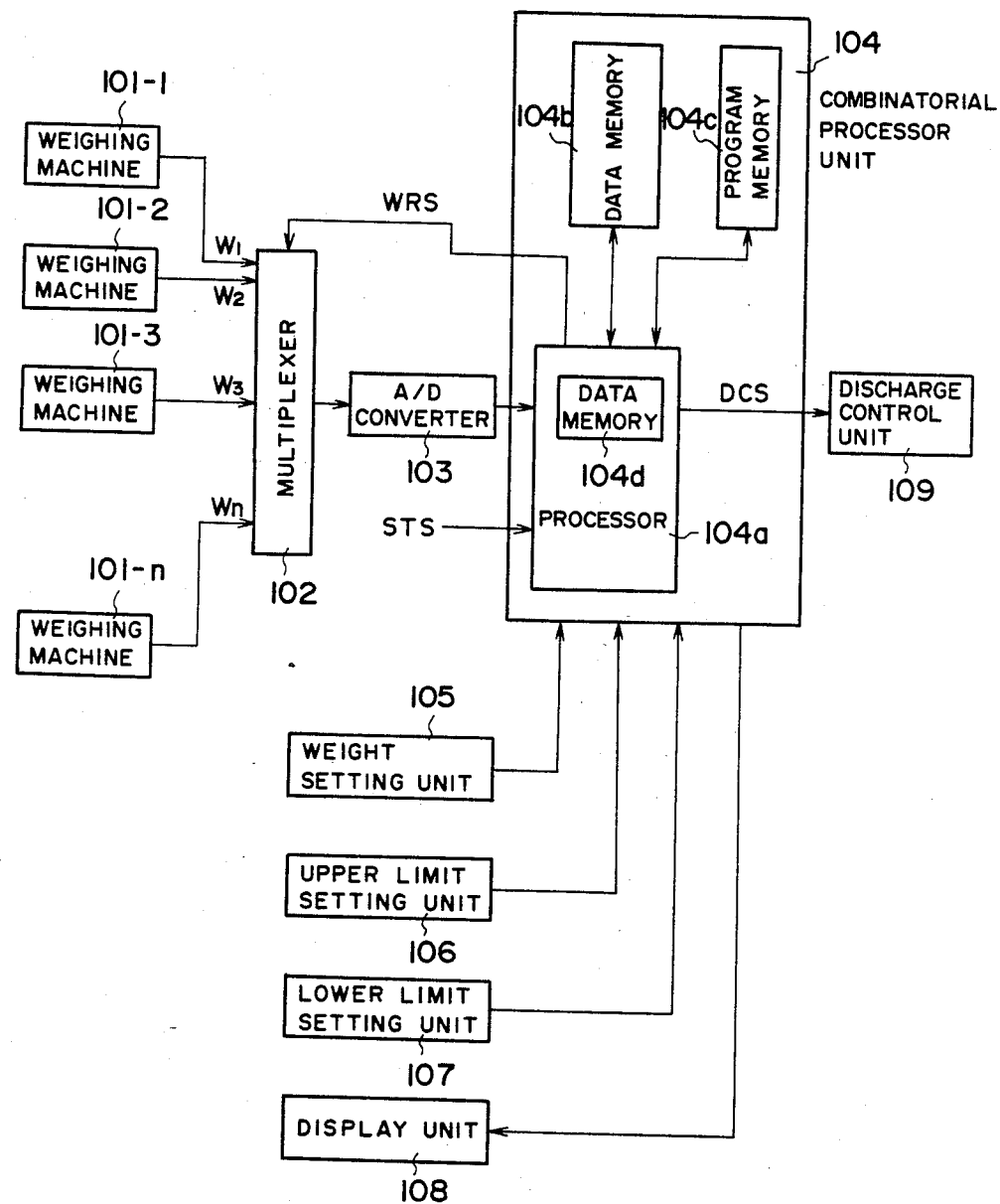
FIG. 2 is a block diagram of the combinatorial weighing apparatus.
Figure 3:
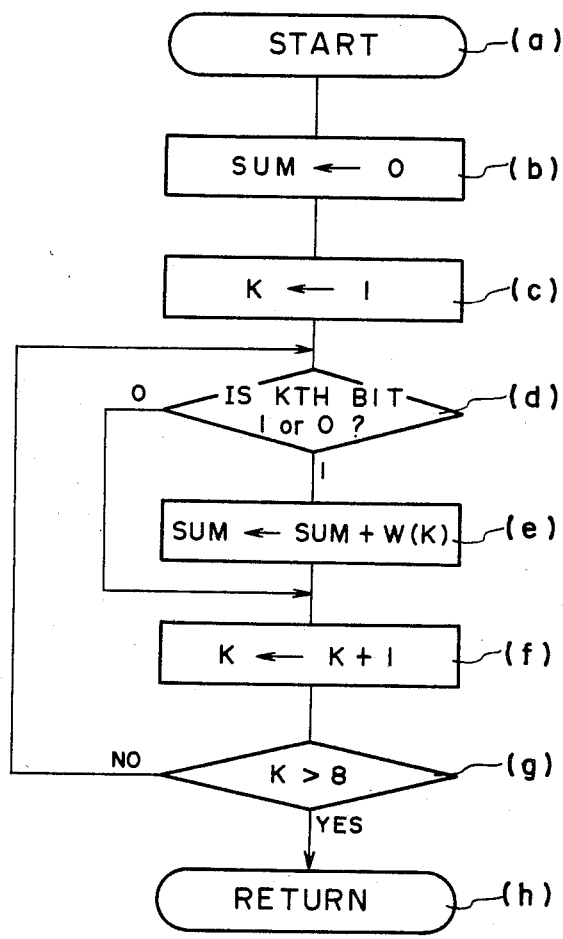
FIG. 3 is a flowchart for the successive steps of computing a combinatorial total weight.

A combinatorial weighing method according to the present invention will be described in greater detail with reference to the drawings.

(I) Pattern 1:

FIG. 5 is illustrative of patterns of weight combinations which serve as a basis for the present invention. The illustrated weight combination patterns are stored in a memory as two sets or group A ($W_1^{10}$-$W_{511}^{10}$) and group B ($W_{512}^{10}$-$W_{1022}^{10}$) into which combinatorial total weight data items are divided. Bits which are all "1" are stored as group C. With the two sets divided as groups A and B, the set B is expressed as a complement of the set A. More specifically, since $W^{10}$ is a whole set, the set B is expressed as:

$$B = \overline{A} = W^{10} - A \quad \ldots (1)$$

Since the set B can be found from the equation (1) by effecting computations to find combinatorial total weights of the set A only, and combinatorial computations for the set B may be omitted.

Therefore, the number of steps required for the computations is as follows:

(1) Bit checking:

Since the set of group B is a complement of the set of group A, bit checking may be effected with respect to group A only. Only 9 bits are checked as there is no bit of "1" for the 10th weighing machine in group A. Thus, bit checking is required to be effected as many as:

$$9 \times 511 = 4599 \quad \ldots (i)$$

(2) Number of additions:

(a) Groups A and C:

As described with reference to FIG. 4, the number of additions for group A is given as follows:

$$\begin{aligned}&(_9C_1 \times 1) + (_9C_2 \times 2) + (_9C_3 \times 3) + (_9C_4 \times 4) + \\&(_9C_5 \times 1) + (_9C_6 \times 6) + (_9C_7 \times 7) + (_9C_8 \times 8) + (_9C_9 \times 9) = \\&(9 \times 1) + (36 \times 2) + (84 \times 3) + (126 \times 4) + \\&(126 \times 5) + (84 \times 6) + (36 \times 7) + (9 \times 8) + (1 \times 9) = 2304\end{aligned} \quad \ldots (ii)$$

In order to compute the sum of weights of the ten weighing machines, the addition of:

$$W_{1023}^{10} = W_1 + W_2 + \ldots + W_{10}$$

is effected, and hence 10 additions are necessary. As a result, the number of additions for groups A and C is:

$$2304 + 10 = 2314 \quad \ldots (iii)$$

(b) Group B:

The combinatorial total weight value for group B is determined by subtraction from the equation (1), and 511 computations are required.

(c) The number of computations required for all of groups A, B, and C is:

$$2314 + 511 = 2825 \quad \ldots (iv)$$

(II) Pattern 2:

FIG. 6 is a diagram of other combination patterns of weights which serve as a basis for the present invention. In the illustrated combination patterns, weight data items are divided into groups A and B in a manner different from the manner in which data items are divided in Pattern 1.

The symbol $C_i^a$ used here is indicative of a set of combinations wherein selected elements have i patterns with a representing a bit number.

$C_{5-1}^5$ and $C_{5-2}^5$ are complements of each other, and $$C_5^{10} = C_{5-1}^{10} + C_{5-2}^{10} \quad (2)$$

$$C_{5-2}^{10} = \overline{C_{5-1}^{10}} = C_5^{10} - C_{5-1}^{10} \quad (3)$$

Therefore, assuming that the set A and the set B are expressed by:

$$A = C_1^{10} \cup C_2^{10} \cup C_3^{10} \cup C_4^{10} \cup C_{5-1}^{10} \quad (4)$$

$$B = C_{5-2}^{10} \cup C_6^{10} \cup C_7^{10} \cup C_8^{10} \cup C_9^{10} \quad (5)$$

(where $U$ is the sum (OR) of sets)

then, $$\begin{array}{rcl}(\text{Group } B) & & (\text{Group } A) \\ C_9^{10} & = & \overline{C}_1^{10} \\ C_8^{10} & = & \overline{C}_2^{10} \\ C_7^{10} & = & \overline{C}_3^{10} \\ C_6^{10} & = & \overline{C}_4^{10} \\ C_{5-2}^{10} & = & \overline{C}_{5-1}^{10}\end{array} \quad (6)$$

Therefore, the set B can be derived from the set A, and combinatorial weight additions may be effected only for the combinations of the set A.

Thus, the number of steps required for the computations is as follows:

(1) Bit checking:

No bit checking is necessary for the set B, but only group A may be checked. Bit checking is required to be effected as many as:

$$10 \times 511 = 5110 \quad \ldots (i)$$

(2) Number of additions:

(a) Groups A and C:

The number of additions for group A is given as follows:

$$\begin{aligned}&(_{10}C_1 \times 1) + (_{10}C_2 \times 2) + (_{10}C_3 \times 3) + \\&(_{10}C_4 \times 4) + (_{10}C_5 \times 1) \times \tfrac{1}{2} = \\&(10 \times 1) + (45 \times 2) + (120 \times 3) + (210 \times 4) + \\&(252 \times 5) \times \tfrac{1}{2} = 1930\end{aligned} \quad \ldots (ii)$$

The sum of weights of the 10 heads for group C is:

$$_{10}C_{10} \times 10 = 10 \quad \ldots (iii)$$

The number of additions for groups A and C is:

$$(ii) + (iii) = 1930 + 10 = 1940 \quad \ldots (iv)$$

(b) Group B:

Group B is determined by subtracting the combinatorial total weight of group A from group C, the number of subtractions required is 511.

(c) The number of computations required for all of groups A, B, and C is:

$$1940 + 511 = 2451 \quad \ldots (v)$$

(III) Pattern 3:

FIG. 7 is a diagram of combination patterns according to an embodiment of the present invention. Pattern 3 is a mixture of the conventional patterns shown in FIG. 4 and Pattern 1 in FIG. 5. More specifically, according to the combination patterns of FIG. 7, the 1st through 8th weighing machines are in groups B, C and the 9th and 10th weighing machines are in group A, with group B being divided into group $B_1$ and group $B_2$ (which is a complement of group $B_1$). Therefore, the following relationship is present between groups $B_2$ and $B_1$:

$$B_2 = \overline{B}_1 = W^8 - B_1 \qquad \ldots (7)$$

(where $W_8$ is representative of the total weight of the 1st through 8th weighing machines)

The number of steps required in this case is as follows:

(1) Bit checking:

Bit checking is effected for the 1st through 7th weighing machines in group $B_1$ as many times as $$7 \times 127 = 889 \qquad \ldots (i)$$

(2) Number of additions:

(a) First the number of additions for $W_1^8 - W_{127}^8$ for group $B_1$ is as follows:

$$\begin{aligned}(_7C_1 \times 1) + (_7C_2 \times 2) + (_7C_3 \times 3) + (_7C_4 \times 4) + \\ (_7C_5 \times 5) + (_7C_6 \times 6) + (_7C_7 \times 7) = \\ (7 \times 1) + (21 \times 2) + (35 \times 3) + (35 \times 4) + \\ (21 \times 5) + (7 \times 6) + (1 \times 7) = 448\end{aligned} \qquad (ii)$$

(b) Then, one addition is effected for $W_9^2$ (the 10th and 9th weighing machines) for group A without bit checking ... (iii).

(c) 127 subtractions are effected according to the equation (7) for computing group $B_2$ ... (iv).

(d) The number of combinations of groups $B_1$, $B_2$ and group A (combinations of $W_1^8 - W_{254}^8$ and $W_1^2 - W_3^2$) is:

$$254 \times 3 = 762 \qquad \ldots (v)$$

(e) The number of additions for computing the total weight of the 1st through 8th weighing machines is 8 . . . (vi). By adding (a) through (e), $$448 + 1 + 127 + 254 \times 3 + 8 = 1346 \qquad \ldots (vii)$$

(IV) Pattern 4:

FIG. 8 is a diagram of combination patterns according to another embodiment of the present invention. The illustrated combination patterns are a mixture of Patterns 2 and 3. Pattern 4 differs from Pattern 3 in that groups $B_1$, $B_2$ are divided by the system of Pattern 2. The number of steps required for computations in Pattern 4 is as follows:

(1) Bit checking:

Bit checking is effected for the 1st through 8th weighing machines in group $B_1$ as many times as $$8 \times 127 = 1016 \qquad \ldots (i)$$

(2) Number of additions:

(a) First the number of additions for $W_1^8 - W_{127}^8$ for group $B_1$ is as follows:

$$\begin{aligned}(_8C_1 \times 1) + (_8C_2 \times 2) + (_8C_3 \times 3) + (_8C_4 \times 4) \times \\ \tfrac{1}{2} = (8 \times 1) + (28 \times 2) + (56 \times 3) + \\ (70 \times 4) \times \tfrac{1}{2} = 372\end{aligned}$$

(b) Then, one addition is effected for $W_9^2$ (the 9th and 10th weighing machines) for group A ... (iii).

(c) 8 additions are effected for computing the total weight of the 1st through 8th weighing machines ... (iv).

(d) 127 subtractions are effected according to the equation (7) for computing group $B_2$ ... (v).

(e) The number of combinations of groups $B_1$, $B_2$ and group A is:

$$254 \times 3 = 762 \qquad \ldots (vi)$$

By adding (a) through (e), $$372 + 1 + 8 + 127 + 254 \times 3 = 1270 \qquad \ldots (vii)$$

The numbers of occurrences of bit checking and computations for the conventional example and Patterns 1 through 4 are given for comparison in Table 1:

TABLE 1

| No. | Conventional | Pattern 1 | Pattern 2 | Pattern 3 | Pattern 4 |
|---|---|---|---|---|---|
| Bit checking | 2040 | 4599 | 5110 | 889 | 1016 |
| Computations | 1790 | 2825 | 2451 | 1346 | 1270 |

As is apparent from Table 1, although the number of computations for Patterns 1 and 2 is greater than the conventional number of computations, the number of computations for Patterns 3 and 4 is smaller than the conventional number of computations. Therefore, Patterns 3 and 4 allow a shorter time interval required for finding an optimum combination of weights. The number of occurrences of bit checking is smaller for Pattern 3 than for Pattern 4. However, Pattern 4 is more advantageous since the time required for the overall computation process is shorter as the number of computations is smaller.

Figure 10:
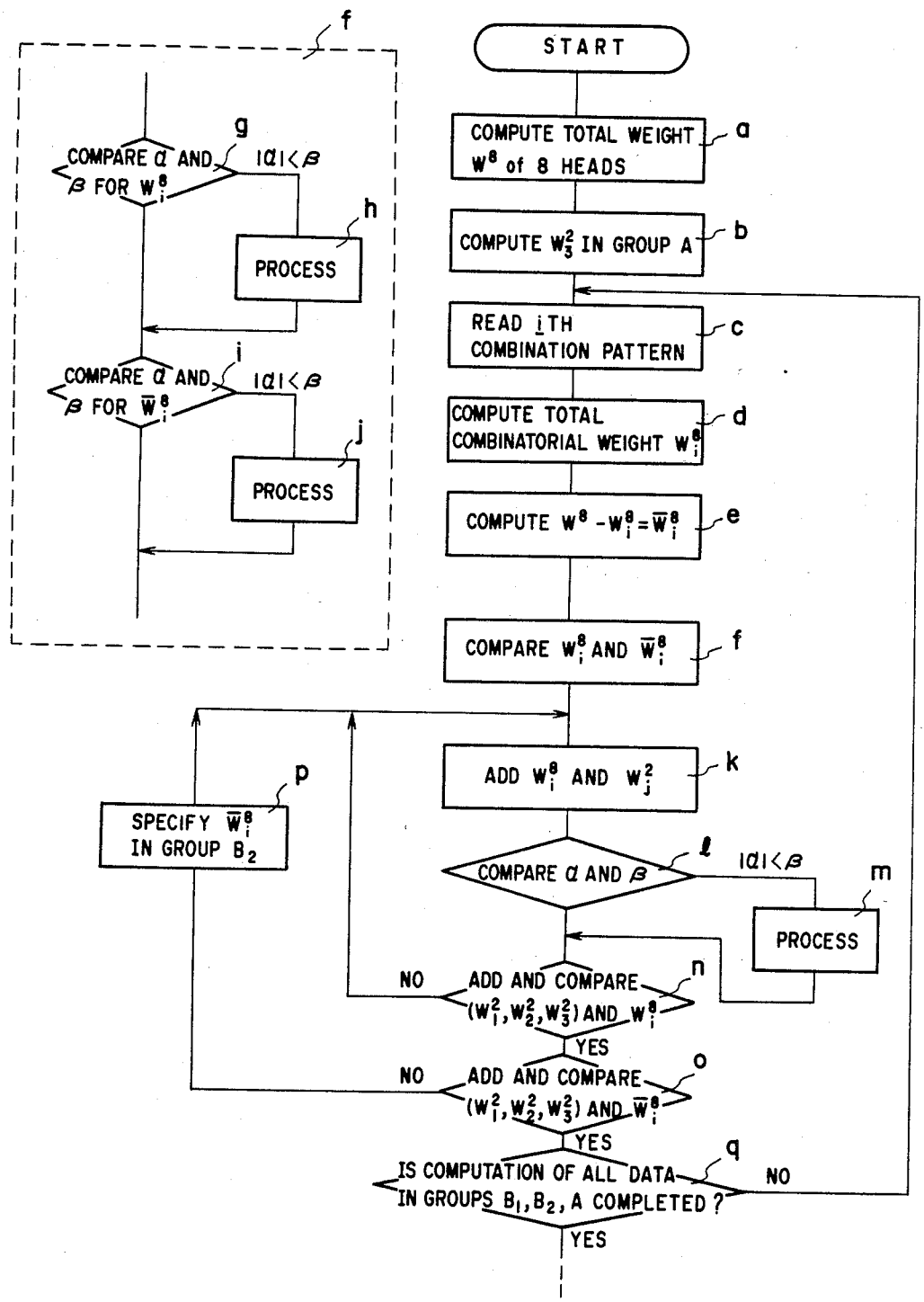
FIG. 10 is a flowchart for the successive steps of combinatorial computation according to the present invention.

Steps of a computation process according to Pattern 4 will be described with reference to the flowchart of FIG. 10.

(1) The processor 104a in the combinatorial processor unit 104 computes the total weight ($W^8$) of the 1st through 8th weighing machines in a step a.

(2) The processor 104a computes the weight $W_9^2$ by adding the weights of the 9th and 10th weighing machines in a step b.

(3) The processor 104a reads an ith combination pattern (the 1st combination pattern is 00000001) out of the combination patterns of group $B_1$ as shown in FIG. 9 from the data memory, in a step c.

(4) The processor 104a computes an ith combinatorial total weight $W_i^8$ in group $B_1$ according to the read-out combination pattern in a step d.

(5) The processor 104a computes a combinatorial total weight $\overline{W}_i^8 (= W^8 - W_i^8)$ in group $B_2$, which is a complement of the computed combinatorial total weight $W_i^8$, in a step e.

(6) The processor 104a makes comparison and processing for the computed combinatorial total weights $W_i^8$, $\overline{W}_i^8$ in a step f.

The comparison and processing will be described in more detail with respect to steps g, i, l and h, j, m. The difference $\alpha$ between a target weight Ws set by the weight setting unit 105 and a combinatorial total weight W is given by:

$$W - Ws \rightarrow \alpha$$

in a comparison mode (steps g, i, l). Then, whether or not a minimum deviation $\beta$ stored in the data memory is greater than the difference $\alpha$ is determined. If $|\alpha| < \beta$, then the minimum deviation $\beta$ is replaced with the difference $|\alpha|$, and a combination pattern corresponding to the difference $|\alpha|$ is stored in the data memory in place of the optimum combination pattern stored up to now. This process is a processing mode (steps h, j, m). Since the minimum deviation has an initial value which is set as a binary number expressed by all 1s, $|\alpha| < \beta$ with the first data.

In a step f, the processor 104a effects the foregoing comparison and processing for the combinatorial total weights $W_i^8$, $\overline{W}_i^8$.

(7) The processor 104a adds, in a step k, the combinatorial total weight $W_j^8$ in group $B_1$ and a jth combinatorial total weight $W_j^2$ in group A (For a first pattern, combinatorial total weights $W_1^8$ and $W_1^2$) in a step k.

(8) The processor 104a effects the comparisons and processing as described above in (6) according to the added combinatorial total weight $(W_i^8 + W_j^2)$ to update the data of the optimum combination pattern in steps l, m.

(9) The steps k through n are repeated three times to add, compare, and process j=1, 2, 3 ($W_1^2$, $W_2^2$, $W_3^2$) in group A and the combinatorial total weight $W^8$ in group $B_1$. If j>3, then the processor sets j to 1 (j←1), and the program goes to a next step in a step n.

(10) Then, the processor 104a adds, compares, and processes the combinatorial total weight $\overline{W}_i^8$ in group $B_2$ and $W_1^2$, $W_2^2$, $W_3^2$ in group A three times. When the processing of the combinatorial total weight $\overline{W}_i^8$ is completed, the program goes to a next step, in steps o, p.

(11) Finally, the processor 104a determines whether the computation of all data items in groups $B_1$, $B_2$, and A has been completed, that is, whether i>127 in a step q.

If i is not greater than 127, then i is incremented by +1(i←i+1), and the program goes to the step c. The steps c through q are then repeated, and if i>127, all combinatorial computations are completed.

When the combinatorial computations are completed, an optimum combination pattern in which the combinatorial total weight is equal or closest to the target weight value is stored in the data memory 104b. If the combinatorial total weight value of the optimum combination pattern falls within an allowable preset range, then the articles are discharged from the weighing machines according to the optimum combination pattern.

Although certain preferred embodiments have been shown and described, it should be understood that many changes and modifications may be made therein without departing from the scope of the appended claims.

What I claim is:

1. A method of combinatorial weighing in a combinatorial weighing apparatus including a plurality of weighing machines for weighing charged articles, and a combinatorial processor unit for computing combinations of weight values issued from the weighing machines and for determining an optimum weight combination equal to a target weight value or closest to the target weight value within an allowable preset range, the method comprising the steps of:
   (a) providing two groups of patterns of combinations of the weight values;
   (b) dividing one of the groups into two subgroups which are complements of each other; and
   (c) successively processing the two groups of patterns independently and in combination to find the optimum weight combination.

2. A method according to claim 1, wherein said step (c) includes determining combinatorial weight values in one of said subgroups in said one group by subtracting the corresponding combinatorial weight value of the other subgroup from the sum of the weights of said one group.

3. A method of combinatorial weighing in a combinatorial weighing apparatus including a plurality of weighing machines for weighing charged articles and for generating weight values, comprising the steps of:
   (a) dividing the weight values into first and second groups;
   (b) generating a first group of combination patterns corresponding to combinations of the first group of weight values;
   (c) generating a second group of combination patterns corresponding to combinations of the second group of weight values;
   (d) dividing the second group of combination patterns into first and second subgroups of combination patterns, the first subgroup of combination patterns being a complement of the second subgroup of combination patterns; and
   (e) performing combinatorial processing on the first and second groups of combination patterns to determine an optimum weight combination equal to a target weight value or closest to the target weight value within an allowable preset range.

4. A method according to claim 3, wherein said step (e) comprises the substeps of:
   (e') computing a total weight equal to the sum of all of the weight values in the second group of weight values;
   (e'') computing a first set of combination weights equal to the sum of the weight values for each combination in the first group of combination patterns;
   (e''') computing a second set of combination weights equal to the sum of the weight values for each combination pattern in the first subgroup of combination patterns;
   (e'''') computing a third set of combination weights equal to the differences between the total weight computed in said substep (e') and the second set of combination weights computed in said substep (e'''); and
   (e''''') performing combinatorial processing to determine the optimum weight combination from among the second set of combination weights, the third set of combination weights, a combination of the first set of combination weights and the second set of combination weights, and a combination of the first set of combination weights and the third set of combination weights.

5. A method of combinatorial measuring in a combinatorial measuring apparatus for handling weighed batches of articles having corresponding batch values, comprising the steps of:

(a) dividing the batch values into first and second groups;

(b) generating a first group of combination patterns corresponding to combinations of the first group of batch values;

(c) generating a second group of combination patterns corresponding to combinations of the second group of batch values by providing first and second subgroups of combination patterns, the first subgroup of combination patterns being a complement of the second subgroup of combination patterns; and (d) performing combinatorial processing on the first and second groups of combination patterns to determine an optimum measured combination equal to a target value or closest to the target value within an allowable preset range.

6. A method according to claim 5, wherein said step (d) comprises the substeps of:

(d') computing a total value equal to the sum of all of the batch values in the second group of batch values;

(d'') computing a first set of combination values corresponding to the sum of the batch values for each combination in the first group of combination patterns;

(d''') computing a second set of combination values corresponding to the sum of the batch values for each combination pattern in the first subgroup of combination patterns;

(d'''') computing a third set of combination values corresponding to the differences between the total value computed in said substep (d') and the second set of combination values computed in said substep (d'''); and (d''''') performing combinatorial processing to determine the optimum measured combination from among the second set of combination values, the third set of combination values, a combination of the first set of combination values and the second set of combination values, and a combination of the first set of combination values and the third set of combination values.

* * * * *

UNITED STATES PATENT AND TRADEMARK OFFICE
CERTIFICATE OF CORRECTION

PATENT NO. : 4,557,340
DATED : DECEMBER 10, 1985
INVENTOR(S) : MASAO FUKUDA

It is certified that error appears in the above-identified patent and that said Letters Patent is hereby corrected as shown below:

FRONT PAGE [57] ABSTRACT, line 4, "machines, one" should be --machines. One--.

Col. 2, line 30, "Weighing" should be --The weighing--;
line 36, after "weighing" insert --operation--;
line 63, "a" (second occurrence) insert --$\underline{a}$--.

Col. 3, line 52, "+ x (28 x 2)" should be --+ (28 x 2)--.

Col. 6, line 5, "a" (first occurrence) should be --$\underline{a}$--;

line 11, "$C^{10}_{5-1}$" (first occurrence) should be

--$\bar{C}^{10}_{5-1}$--.

Signed and Sealed this

Twenty-fifth Day of March 1986

[SEAL]

Attest:

DONALD J. QUIGG

Attesting Officer     Commissioner of Patents and Trademarks